April 30, 1968    E. L. WALTERS ET AL    3,380,289
TESTING APPARATUS

Filed June 10, 1965    5 Sheets-Sheet 1

INVENTORS
Emmett L. Walters and
BY James H. Boicey
Nobbe & Swope
ATTORNEYS

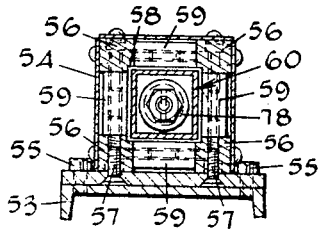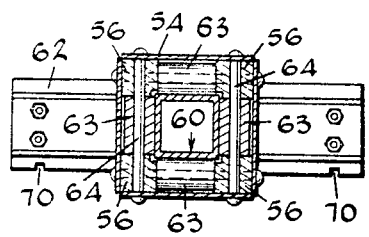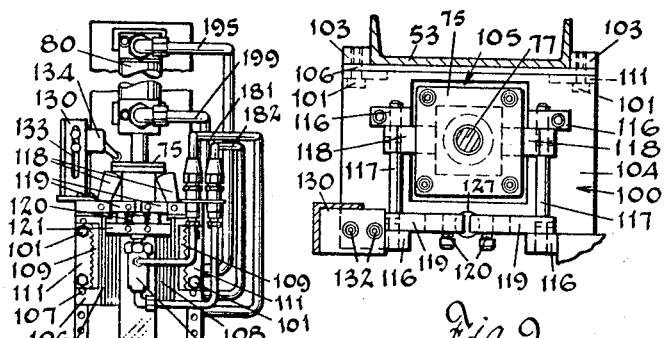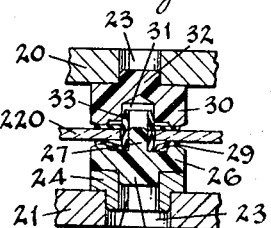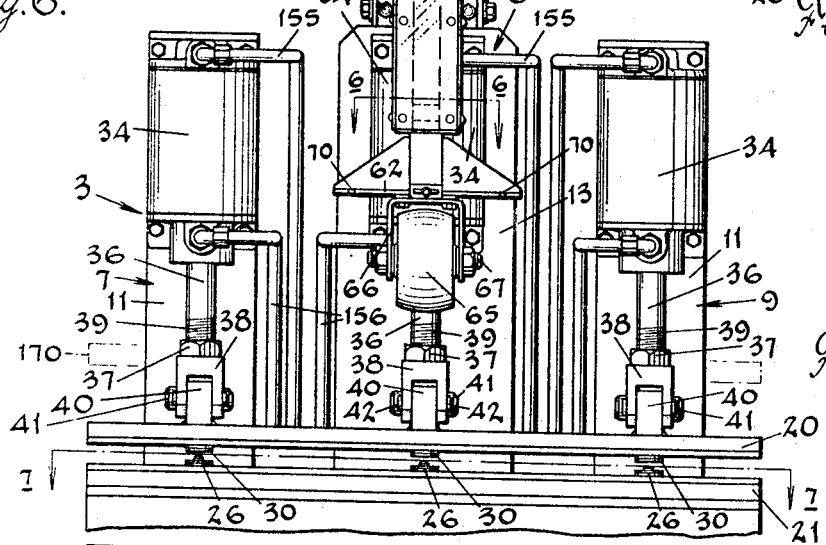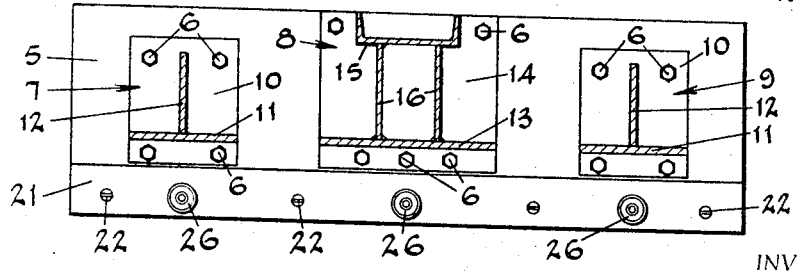

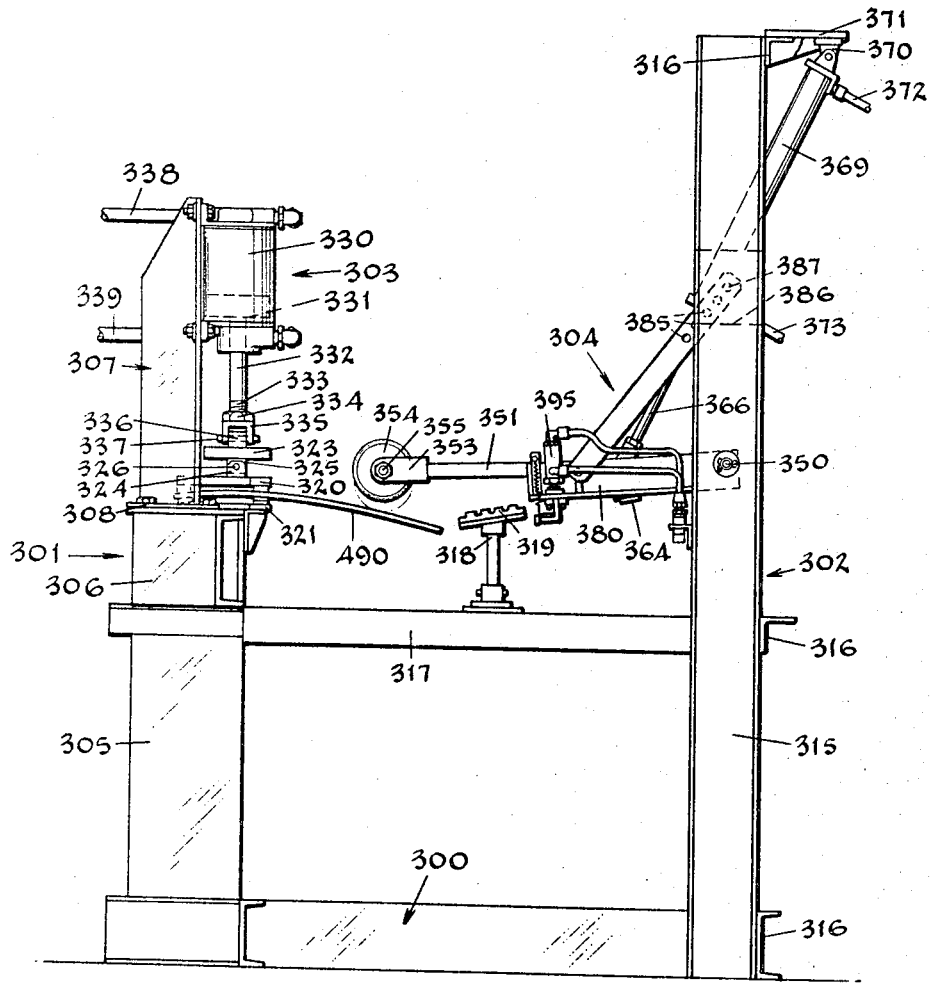
Fig.11.
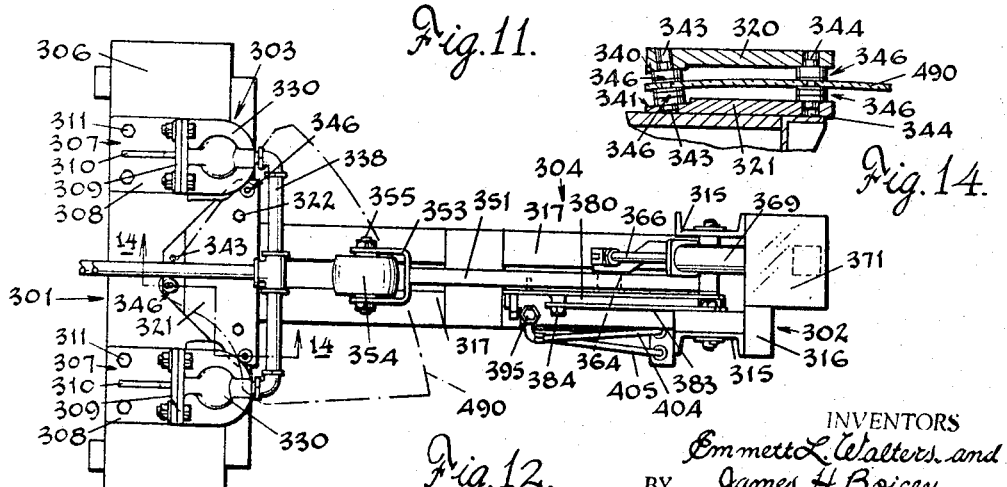
Fig.14.
Fig.12.
INVENTORS
Emmett L. Walters and
BY James H. Boicey
Nobbe & Swope
ATTORNEYS April 30, 1968  E. L. WALTERS ETAL  3,380,289
TESTING APPARATUS
Filed June 10, 1965

INVENTORS
Emmett L. Walters and
James H. Boicey
Nobbe & Swope
ATTORNEYS

April 30, 1968  E. L. WALTERS ET AL  3,380,289

TESTING APPARATUS

Filed June 10, 1965  5 Sheets-Sheet 5

INVENTORS
*Emmett L. Walters and
James H. Boicey*

*Hobbs & Swope*
ATTORNEYS

United States Patent Office 3,380,289
Patented Apr. 30, 1968

3,380,289
TESTING APPARATUS
Emmett L. Walters and James H. Boicey, Toledo, Ohio, assignors to Libbey-Owens-Ford Glass Company, Toledo, Ohio, a corporation of Ohio
Filed June 10, 1965, Ser. No. 462,865
4 Claims. (Cl. 73—12)

ABSTRACT OF THE DISCLOSURE

An impact testing apparatus for production testing automobile windows having mounting holes drilled along their edges. The sheets are cantilever mounted in a manner which simulates actual mounting conditions and a weight is dropped a predetermined distance to fall at a predetermined point on the surface of the sheet. Operation is semi-automatic so that when the weight is manually released from a latched position its downward movement actuates a lifting member which returns it in position to strike the next sheet. Upon return of the weight to the latched position the lifting member is automatically moved to an out-of-the-way position to permit free fall of the weight.

---

This invention relates broadly to a testing machine of the impact type. More particularly, the present invention relates to a novel testing device for rapidly checking the capability of the mounting portion of a sheet member to withstand specified impact and vibratory forces to which the member may be subjected in use.

Recently, the trend in automobile styling has been towards the removal of the conventional frame around the side and door windows. Since the conventional frames have heretofore been a major portion of the support means for the window, this development has necessitated a new type of mounting means for the windows within the automobile. One method of mounting such unframed windows includes the provision of openings adjacent the lower portion thereof with a mounting member secured to said portion by means of securing devices extending through the openings. One of the problems encountered in such mounting means is that the mounting portion of the unit must be capable of withstanding severe impact and vibratory forces encountered in normal use of the automobile such as may occur in traveling over rough roads, in slamming doors or even in minor accidents.

This invention is therefore directed towards providing a novel device for checking the mounting portions of a sheet member, such as an automobile window, by providing simulated impact and vibratory forces to the member while it is mounted in a manner substantially reproducing the mounting in use.

The primary object of the invention is the provision of a novel device for rapidly checking a unit to determine its capability to withstand given impact and vibratory forces.

Another object is the provision of a specimen holding means which simulates the clamping and load conditions on the mounting portion of the specimen which may be encountered in actual use.

A further object is the provision of a novel impact member which is readily adjustable to provide the desired impact load on the unit.

A still further object of the invention is to provide a testing device which may be readily adapted to checking various sizes and shapes of units.

Other objects and advantages of the invention will become more apparent during the course of the following description when read in connection with the accompanying drawings.

In the drawings, wherein like numerals are employed to designate like parts throughout the same:

FIG. 3 is an enlarged fragmentary end view of the device;

FIG. 5 is a longitudinal sectional view taken along lines 5—5 of FIG. 3;

FIG. 6 is a longitudinal sectional view taken along lines 6—6 of FIG. 3;

FIG. 7 is a longitudinal sectional view taken along lines 7—7 of FIG. 3;

FIG. 8 is an enlarged fragmentary view of a portion of the clamping assembly;

FIG. 9 is a plan view of the upper support assembly with parts being in section;

FIG. 11 is a side elevation of a modified form of the invention;

FIG. 12 is a plan view of the same with part of the upper clamping plate being broken away;

FIG. 14 is a partial transverse sectional view taken along lines 14—14 of FIG. 12;

Figure 4:
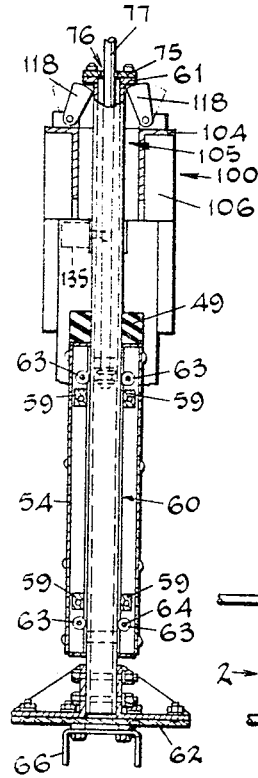
FIG. 4 is a transverse sectional view taken along lines 4—4 of FIG. 1.

Referring to FIGS. 1–10 of the drawings, there is shown a preferred embodiment of the impact testing device or apparatus of the invention which includes a pedestal 1, support means 2 for mounting a specimen clamping means or assembly 3, and an impact means or assembly 4.

The support means 2 include a base 5 mounted on the pedestal. Extending above the base and mounted thereon by means of bolts 6 are three support columns 7, 8 and 9 (FIGS. 3 and 7). Support columns 7 and 9 each include a base plate 10 with a plate 11 extending above the base plate and having a rigidifying flange 12 secured thereto. The central column 8, includes a plate 13 adjacent the forward edge of a base plate 14 and a channel 15 adjacent the rear edge with support flanges 16 fixed between the plate and channel. Extending above the plate 13 is a second channel 17 (FIG. 2) with the outersurfaces of the legs of both channels 15 and 17 being in alignment with each other and each leg having a plurality of apertures, for a purpose to be described later. The vertically extending plates 11 and 13 are positioned in a common vertical plane above the base 5, for purpose to be described later.

The novel specimen clamping means or assembly is arranged and constructed in accordance with the invention to substantially duplicate the mounting of the unit in actual use. In other words, the assembly provides for duplication of clamping and load conditions adjacent the mounting openings by having one of the clamping plates mounted for movement through fluid operated cylinders through which the pressure on the clamping plate may be varied to conform to desired load conditions on the test specimen or unit. More specifically, the clamping and load conditions on the mounting portion of a unit may be calculated from the amount of torque applied to the securing devices in the final assembly and converted to a corresponding fluid pressure within the cylinders to substantially duplicate the load conditions on the mounting portion of the unit.

It should be noted at this point that although the clamping means will be described in connection with an assembly for mounting a sheet member having three spaced aligned mounting openings, the invention is by no means limited to such use. It being clearly understood that it is within the spirit of the invention to provide any arrangement of clamping plates corresponding to the mounting means of a particular unit for mounting the subject unit for testing.

The specimen clamping means 3 includes a clamp plate assembly having upper and lower clamping plates or bars 20 and 21, respectively (FIGS. 3, 7 and 8). The lower clamping plate 21 is attached to the base 5 by means of screws 22. Three pairs of vertically aligned spaced holes 23 are provided in the clamping plates. Each of the pairs of aligned openings receive a specimen mounting assembly as shown in FIG. 8. The holes in the lower clamping plate 21 are each provided with a locator button spacer 24 having a concentric opening 25 therein for receiving specimen locator buttons 26 which have circular projections 27 and 28 extending from opposite ends thereof with the lower projections 28 being received in the openings 25 of the spacer 24. The upper projections 27 of buttons 26 receive eyelets 29. Mounted in each of the openings of the upper clamp plate are specimen locator buttons 30 each having a recess 31 in the lower portion thereof and a projection 32 in the upper portion, with the projection 32 extending into opening 23 and the recesses receiving eyelet 33.

The upper clamping plate is mounted for vertically reciprocating movement by means of cylinders 34, receiving pistons 35, having rods 36 extending from the lower portion thereof. A locking nut 37 and yoke 38 are received on threaded portions 39 of each rod with the legs of each yoke having aligned openings. The upper clamping plate is provided with three spaced lugs 40 having openings therein which are pivotally mounted within the legs of yokes 38 by means of pins 41 extending through the aligned openings of the yokes and the lugs and held in position with cotter pins 42.

The impact means 4 (FIGS. 1 and 2) includes support plates 50 each having a plurality of elongated slots 51. The rear portions of the plates are adjustably mounted on the aligned surfaces of the legs of the channels 15 and 17 by means of bolts 52 extending through slots 51. A channel 53 extends between and is fastened to the inner surfaces of the forward edges of support plates 50 with a major portion thereof extending above the plates and providing the support for the impact member. A hollow guide member 54 is secured to the lower portion of the web of channel 53 by bolts 55. The guide member is rectangular in configuration, as shown in FIGS. 4, 5 and 6, and includes four bearing blocks 56 mounted at each inner corner thereof with screws 57, each bearing block providing a bearing surface 58 on the inner portion thereof. Spacers 59 are secured between adjacent bearing blocks as shown in FIGS. 4 and 5. A resilient shock absorbing member 49 is provided adjacent the upper surface of the hollow guide member.

Mounted within the guide member is a freely movable sleeve 60 having a flange 61 at the upper end and a guide plate 62 at the lower end thereof. The sleeve 60 is freely movable within the guide member and is centered therein by means of spaced groups of rollers 63. The rollers 63 are located between spaced bearing blocks 56 by means of pins 64 (FIG. 6). Although only two such groups of rollers and spacers are shown, it is obvious that any number may be located at spaced points along the guide members.

A weight 65, preferably of hard rubber, is rotatably mounted in a U-shaped member 66 by a bolt 67, the U-shaped member being secured to a C-shaped member 68 slidably received on guide plate 62 on the lower end of sleeve 60. The guide plate is provided with a plurality of slots 70 adjacent one edge thereof to selectively receive a spring-biased pin 69 which allows for horizontal adjustment of the weight with respect to the sleeve 60. The sleeve 60 and weight 65 with associated elements comprise the impact member of the apparatus.

The elongated slots 51 and the slidable C-shaped member 68 will allow for two-directional horizontal adjustment of the weight 65 to position the impact on the test specimen in various positions, which may be determined from the size of the specimen and the desired location of the impact on the specimen.

A plate 75 having a circular opening 76 located in the center thereof is secured to the upper flange 61 of the sleeve and slidably receives a shaft or rod 77. The lower portion of the shaft has an enlargement 78 to retain the shaft within the sleeve 60. The upper portion of the shaft 77 has a piston 79 secured thereto for reciprocal movement within a cylinder 80 which is attached to the upper portion of channel 53.

Figure 1:
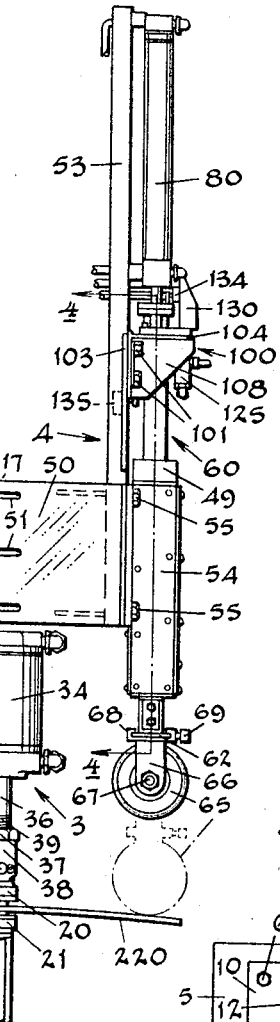
FIG. 1 is a side elevation of a testing device constructed in accordance with this invention.

An upper support assembly 100 is adjustably secured to channel 53 by means of bolts 101, received in apertures 102 of plates 103, fixed to the opposite sides of the channel 53. The upper support assembly is best shown in FIGS. 1, 3 and 9 and includes a base plate 104 having a rectangular opening 105 allowing for vertical movement of the sleeve 60 with flange 61 and plate 75 therethrough. A plate 106 having elongated slots 107 is fixed to the lower rear edge of the base plate with the securing devices 101 extending through the slots. Flanges 108 are provided to rigidify the assembly. Rigidly secured to the plate 106 are members 109 having triangular shaped extensions forming teeth along one edge thereof. Two plates 111 are located adjacent the members 109 which have teeth corresponding to the teeth of members 109 along one edge thereof. The two plates 111 are located adjacent the members 109 with the respective sets of teeth interfitting. The plates 111 are further provided with openings for receiving the bolts 101 securing the entire assembly to the channel member 53.

As can be seen in FIG. 3, the plates 103 are provided with a plurality of apertures 102 in spaced relationship, for example a spacing of one inch between apertures. This will allow for vertical adjustment of the upper support assembly on the channel 53. Furthermore, vertical movement of members 111 with respect to plates 109 to have different portions of the respective teeth interfitted will provide for limited minute adjustment of the upper plate assembly on the channel 53, for example up to one inch of adjustment of the base plate on the upper support assembly. The combined adjustments will allow for minute vertical adjustment of the upper support assembly which in turn will position the impact member with respect to the test specimen to create the desired impact force on the test specimen.

The upper surface of the base plate 104 is provided with brackets 116 having rods 117 pivotally mounted therein. Adjacent one end of the rods are ears 118 rigidly secured to the rods with extensions 119 provided at the opposite ends of the rods, also being rigidly secured thereto. The extensions 119 are biased downwardly by means of springs 120 secured to a plate 121 which is provided between the flanges 108. The ears 118 in their normal position, as shown in FIG. 3, engage the undersurface of flange 61 to retain the sleeve 60 in an upward position. A cylinder 125 is secured to the lower surface of plate 121 and has reciprocally mounted therein a piston 126 having a rod 127 extending above the piston through an opening in plate 121. The rod is directly below the ends of extensions 119, as seen in FIG. 9, for a purpose to be described hereinafter.

Also mounted on the upper surface of the base plate 104 is a bracket 130 attached to the plate by means of screws 132. The bracket has an elongated slot 133 for adjustably mounting an upper limit switch 134, with the switch being in the path of movement of the plate 75 mounted on the sleeve 60. A lower limit switch 135 is spaced below the upper limit switch and positioned on the channel 53 within the vertical path of movement of the flange 61 of sleeve 60.

Figure 10:
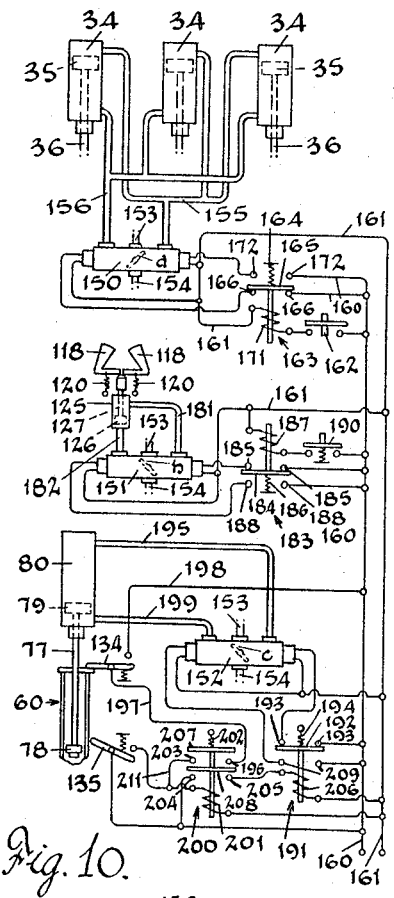
FIG. 10 is a diagrammatical representation of a control system for the device shown in FIGS. 1–9.
Figure 2:
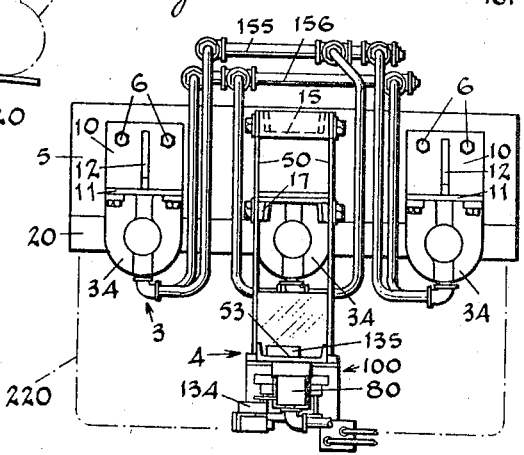
FIG. 2 is a plan view of the same.
Figure 13:
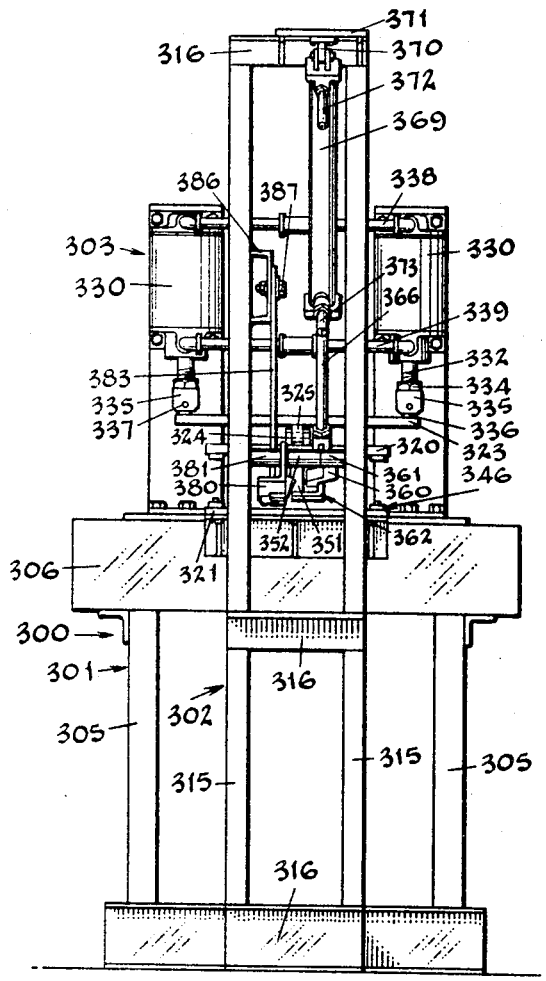
FIG. 13 is an end elevation of the same.

A preferred control system for the impact testing apparatus of FIGS. 1-9 is diagrammatically shown in FIG. 10 and includes a fluid control system and electrical circuitry for the fluid control system.

The fluid control system includes three electrically operated control or reversing valves 150, 151 and 152, each being provided with fluid through inlet ports 153. Exhaust ports 154 are provided for discharging fluid from the respective valves. The first control valve 150 hereinafter referred to as the clamping control valve, is connected to upper and lower inlets of cylinders 34 through conduits 155 and 156, respectively.

The electrical circuit for the clamping control valve 150 includes supply lines 160 and 161 from an electrical source, a manually operated switch 162 and a relay switch 163. With the manually operated switch open and a source of energy supplied to lines 160 and 161, the relay switch 163 is de-energized with the spring 164 forcing the bar 165 into engagement with contacts 166 completing the circuit to one side of the electrically operated clamping control valve. This will locate the valve as shown at a and thus supply fluid through the conduits 156 to the lower surface of pistons 35 within cylinders 34 moving the upper clamping plate 20 to a raised position shown by the broken line 170 in FIG. 7. By manual operation of the switch 162 the circuit will be completed to the solenoid 171 of relay switch 163 moving the bar 165 into engagement with contacts 172, thereby completing the circuit to the other side of the electrically operated clamping control valve. This will reverse the position of the valve and supply fluid to the opposite sides of the pistons 35 within cylinders 34 moving the upper clamping plate 20 to the lower position shown in FIG. 7.

A second electrically operated valve 151, hereinafter referred to as the release control valve, is connected to opposite ends of cylinder 125 through conduits 181 and 182. A relay switch 183 having a bar 184 which is normally biased in engagement with contacts 185 by spring 186, completing the circuit to one side of the release control valve locating the valve as shown at b and thus providing fluid through conduit 181 which moves the piston 126 to the lower position. Temporary depression of spring-biased switch 190 will complete a circuit from line 160 to the solenoid 187 of relay switch 183. This will move the bar 184 into engagement with contacts 188 completing a circuit to the opposite side of the valve reversing its position and providing fluid through conduit 182 to the opposite side of piston 126 moving it upwardly, engaging extensions 119 and rotating the ears 118 against the bias of springs 120, for a purpose to be directed later.

A third electrically operated control valve 152, hereinafter referred to as the lifting control valve, is positioned as shown at c by having one side normally energized through the bar 192 of a relay switch 191 being forced into engagement with contacts 193 by spring 194 completing the circuit from line 160 to said one side of the valve, thereby providing fluid through conduit 195 to the upper side of piston 79 within cylinder 80.

Downward movement of sleeve 60 will release the upper limit switch 134 which will provide energy from line 160 to contact 196 through wires 197 and 198. Continued downward movement of sleeve 60 will trip the lower limit switch 135 temporarily completing the circuit to the solenoid 201 of relay switch 200. This will move bars 207 and 208 of relay switch 200 against the action of spring 202 with bar 207 engaging contacts 196 and 203 and bar 208 engaging contacts 204 and 205. The solenoid 201 of relay switch 200 will now remain energized through the circuit including wires 197, 198 and 211 and bar 207 of relay switch 200 engaging contacts 196 and 203, the entire circuitry being hereafter referred to as the holding circuit.

The solenoid 206 of relay switch 191 will also be energized through contacts 204 and 205, and bar 208 of relay switch 200. The bar 192 of relay switch 191 will then be moved downwardly into engagement with contacts 209 completing the circuit to the opposite side of the release control valve reversing the valve which provides fluid through conduit 199 to the opposite side of the piston 79 moving the rod or shaft 77 upwardly. The upward movement of the rod 77 will raise the sleeve 60 thereby tripping the lower limit switch 135. However, both relay switches 191 and 200 will remain energized through the holding circuit described above. Upon reaching its upper limit of travel, the plate 75 on sleeve 60 will engage upper limit switch 134 opening the circuit from the power supply 160 thereby de-energizing solenoid 201 of relay switch 200 which in turn will open the circuit through solenoid 206 of relay switch 191. The bar 192 of relay switch 191 will then be moved upwardly into engagement with the upper contacts by means of the spring 194. This will reverse the release control valve to provide fluid to the upper side of cylinder 80 moving the piston 79 and the rod 77 to a downward position. The bars 207 and 208 will also be moved out of engagement with respective contacts by the spring 202.

Referring now to the operation of the impact testing apparatus, it will be assumed that the upper support assembly supporting the impact member has been positioned the desired distance above the test specimen to produce the preferred impact load on the test specimen. It will also be assumed that one side of the clamping control valve has been energized raising the clamping plate 20; and that the impact member, including sleeve 60 and weight 65, has been raised with the ears 118 being biased into engagement with the lower surface of the flange 61 on the sleeve. It will further be assumed that the release and lifting control valves are properly activated to locate the pistons 126 and 79 in the respective positions shown in FIG. 10.

A test specimen or sheet member 220 is positioned on the lower clamping plate with the mounting openings on the edge of the specimen engaging the eyelets 29 on the upper extension 27 of the inserts 26. The manual operated switch 162 is then closed completing a circuit to the solenoid 171 of relay switch 163 which will move the bar 165 into engagement with contacts 172 completing the circuit to the opposite side of the clamping control valve 150 reversing the valve. This will move the upper clamping plate downwardly clamping the test specimen between the upper and the lower clamping plates 20 and 21, as shown in FIG. 1.

Temporary depression of the spring-biased switch 190 will complete the circuit to the solenoid 187 of relay switch 183 thereby moving the bar 184 to the lower position into engagement with contacts 188. This will complete the circuit to the opposite side of the release control valve reversing its position and providing fluid through conduit 182 to move the piston 126 and rod 127 upwardly into engagement with extensions 119 on the rods 117, thereby moving the ears 118 out of engagement with the lower surface of the flanges 61 on sleeve 60. The impact member is therefore free to drop or free-fall onto the test specimen. Upon initial downward movement of the sleeve 60, the upper limit switch 134 is closed completing a circuit through the wires 197 and 198 to contact 196. Continued downward movement of the sleeve will trip the lower limit switch 135 energizing the solenoid 201 of the relay switch 200 which in turn will energize the solenoid 206 of relay switch 191. The energizing of relay switch 191 will move bar 192 into engagement with contacts 209 completing the circuit to the opposite side of lifting control valve which will reverse the flow of fluid. The fluid entering the cylinder 80 will move the piston 79 and shaft 77 upwardly thereby raising the impact member to its upward position. Upon reaching the upper limit of travel the flange 61 of sleeve 60 will move past the ears 118 with the springs 120 forcing the ears into engagement with the lower surface of flange 61. At the same time, the upper limit switch will be engaged by the plate 75 de-energizing the solenoid 201 of relay switch 200 and allowing the bars 207 and 208 to move upwardly by action of the spring 202. This will de-energize the solenoid 206 of relay switch 191 allowing upward movement of the bar 192 of relay switch 191 to the upper position by the action of the spring 194 into engagement with contacts 193 which will energize the right hand side of the lifting control valve reversing its position thereby lowering the piston 79 and rod 77 to its lower position.

Upon completion of the testing of the specimen 220, the switch 162 is opened de-energizing solenoid 171 and allowing the spring 164 to move the bar 165 into engagement with contacts 166 completing the circuit to the left hand side of valve 150. This will reverse the flow of the fluid to the cylinders 34 and raise the upper clamping plate for removal of the test specimen.

As can be appreciated from the above description, the impact testing apparatus disclosed therein provides a novel clamping means or assembly for simulating actual mounting conditions on a test specimen. Furthermore, the three directional adjustments of the impact member with respect to the test specimen will allow any desired impact force to be applied to the test specimen in a variety of locations, allowing for greater adaptability of the apparatus for testing various sizes and shapes of test specimen that require diverse load conditions.

A modified form of impact testing apparatus or device of the invention is disclosed in FIGS. 11–17, which includes a base 300 having two spaced support members 301 and 302, a specimen clamping means 303 and an impact means or assembly 304.

The first supporting member 301 for mounting the specimen clamping means or assembly 303 includes a pedestal 305 having a base 306 supported at the upper end thereof. Two columns 307 extend vertically from the base 306; each column comprising a base plate 308, a vertically extending plate 309 and a flange 310 secured to the base plate and support plate to rigidify the structure. The columns are secured to the base 306 by means of securing devices 311 extending through the base plate. The support member 302 for mounting the impact means 304 is spaced from support member 301 and includes two spaced vertically extending channels 315, having braces 316 spaced along one side thereof and rigidly secured thereto to retain the channels in spaced aligned relationship. Crossbars 317 extend between the support members 301 and 302 above the lower portion thereof to hold the support members together.

The specimen clamping means or apparatus which is capable of simulating actual load conditions of the mounted specimen in use, includes upper and lower clamping plates 320 and 321, respectively. The lower clamping plate 321 is attached to the base 306 by means of securing devices 322. The upper clamping plate 320 is pivotally mounted on a bar 323 by means of lugs 324 and 325 and a pin 326. The upper clamping plate and bar are reciprocally mounted directly above the lower clamping bar by means of cylinders 330 secured to plates 309, each cylinder having a piston 331 reciprocally received therein with a rod 332 extending from the lower surface of each piston. Conduits 338 and 339, respectively, are connected to the upper and lower inlets of the cylinder. The lower end of the rod has a threaded portion 333 for threadedly receiving a locking nut 334 and a yoke 335 having aligned openings in the legs thereof. Lugs 336 mounted on the upper surface of the bar 323 are received between the legs of yoke 335 and are secured thereto by means of pins 337.

The upper clamping plate 320 (FIG. 14) is provided with a projection 340 at the rear portion thereof having a lower surface in angular relation to the upper surface of the plate. Also, the lower plate has a recess 341 aligned with the projection at the rear portion thereof with the horizontal surface of the recess being in angular relationship to the lower surface of the lower clamping plate and parallel to the surface of the projection 340. Two pairs of spaced aligned openings 343 are provided through the upper and lower clamping plates in the respective areas of the projection and the recess as shown in FIG. 14. The upper and lower clamping plates also have two further pairs of spaced aligned openings 344 for receiving specimen mounting assemblies 346 such as those disclosed in FIG. 8 herein. Since the specimen mounting assemblies are identical to the ones disclosed in the preferred embodiment of the invention, no further details will be disclosed at this point. By providing the above arrangement, curved windows having three spaced mounting openings adjacent one portion thereof, of the general type used in present-day automobiles, may be mounted between the clamping plates in a manner to simulate the actual mounting within an automobile. It should be noted here that only one pair of spaced aligned openings on the rear portion of the clamping plates are used for mounting any one specimen. More particularly, since the lowermost mounting opening of a curved side window is positioned a certain distance to the left or right of a vertical plane centered between the two uppermost openings for left and right hand units, respectively; by providing the two pairs of spaced aligned openings 343, left hand and right hand side windows may be tested by merely locating the rear specimen mounting assembly in the proper pair of openings.

The impact assembly 304, including an impact member, a lifting means and a release mechanism, is pivotally mounted on a pin 350, received in horizontally aligned openings in the webs of the respective channels 315. The impact member includes a beam 351 having a sleeve 352 mounted at one end thereof and pivotally received on the pin 350. Rigidly secured to the opposite end of the beam is a yoke 353 having a weight 354, preferably of hard rubber material, rotatably mounted therein by means of a bolt 355.

The lifting means includes a bar 360 having a sleeve or bushing 361 at one end thereof, pivotally mounted on the pin 350 adjacent the one side of the impact member. The opposite end of the bar is provided with an angle member 362 having one leg 363 rigidly secured thereto and the opposite leg 364 positioned below and in the path of movement of the impact member. The first leg 363 is provided with an opening for pivotally mounting a clevis 365 which is threadedly received on a rod 366 and located thereon by means of a locking nut 367. The upper end of the rod is provided with a piston 368 reciprocally received in a cylinder 369 which is pivotally mounted on a lug 370 secured to a plate 371 extending from the brace 316 at the upper end of the spaced channels. By providing a source of fluid through appropriate conduits 372 or 373 communicating with the upper and lower inlets of the cylinder, the lifting means may be raised or lowered, for a purpose to be described later.

The release mechanism includes an angle member 380 having a bushing 381 at one end thereof which is pivotally received on the pin 350 opposite the side of the impact member at which the lifting member is mounted. One leg of the angle member is parallel to and in a vertical plane horizontally spaced from the beam while the second leg extends perpendicular to the first leg and away from the beam. The angle member is held at a desired angular position with respect to the channels 315 by means of a bar 383 pivotally secured to the support member with a bolt 384 with the opposite end thereof being provided with a plurality of spaced apertures 385. A support channel 386 rigidly secured to the leg of one of the channels has an opening in the leg thereof for receiving a bolt 387 extending through a selected aperture on the bar to hold the angle member 380 at the desired angle.

A release member is mounted on the angle member at the end opposite from the end on which the bushing is secured. The release member, shown in FIG. 16, includes a generally L-shaped member 390 pivotally mounted on the angle member 380. One arm 391 of the L-shaped member is spring-biased towards the support member by means of a spring 392, with the other arm 393 extending beyond the side edge of the angle member 380 to engage the undersurface of the beam 351 of the impact member. A cylinder 395, having a piston 396 reciprocally received therein with a rod 397 secured to the lower surface of the piston and extending through an opening at one end of the cylinder, is mounted on the angle member 380 by threaded portion 398 received in a partially threaded opening 399 of a lug 400 secured to the horizontal second leg of the angle member 380. An opening 402 communicating with the opening 399 is provided in the leg of the angle member 380. The cylinder assembly is positioned directly above the arm 391 of the L-shaped member 390 with the rod 397 extending through openings 399 and 402 and engaging arm 391. Conduits 404 and 405 are provided to upper and lower inlets in the cylinder 395. By providing a source of fluid through conduit 404 leading to the upper portion of the cylinder 395, the piston 396 will be moved downwardly engaging the arm 391 moving it against the bias of the spring 392 to pivotally move the opposite arm 393 out of engagement of the beam 351, as shown by the broken line in FIG. 16, for a purpose to be described hereinafter.

It should be noted at this point that by locating the bolt 387 through different openings 385 of the bar 383, the angle member 380 and the impact member will be positioned a proportionate height above the test specimen to create the desired impact force on the test specimen.

A limit stop 318 having a resilient member 319 is mounted on crossbars 317 in the path of movement of the impact member to limit the amount of movement in case the test specimen is broken by the impact.

Figure 17:
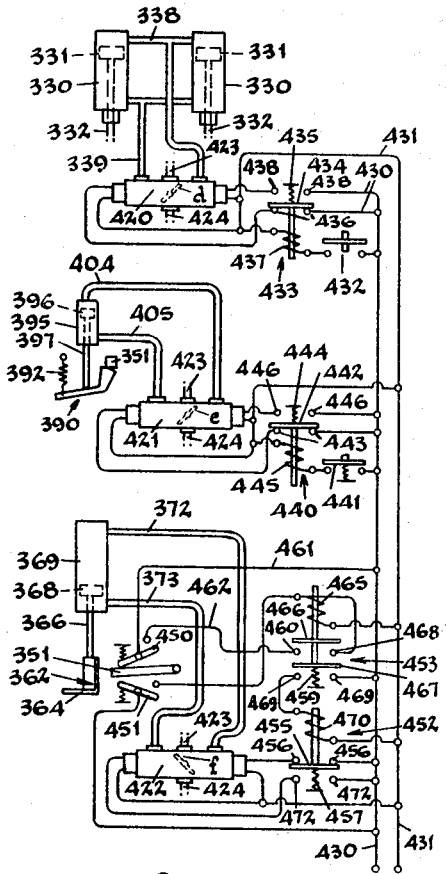
FIG. 17 is a schematic of a control system for the device shown in FIGS. 11–16.

A preferred control system for this embodiment of the impact testing device is shown in FIG. 17 and includes a fluid control system and an electrical control circuit. The fluid control system includes three electrically operated control valves 420, 421 and 422, hereinafter referred to as the clamping control valve, the release control valve and the lifting control valve, respectively. Each of the valves is provided with an inlet port 423 for receiving fluid from a source (not shown) and a discharge port 424 for discharging fluid therefrom.

The clamping control valve 420 is connected to upper and lower inlets of the clamping cylinders 330 through conduits 338 and 339, respectively, with the release control valve 421, being connected to respective inlets of the release cylinder 395 by means of conduits 404 and 405. The lifting control valve 422 is connected to respective inlets of the lifting cylinder 369 through conduits 372 and 373.

The electrical control circuit includes a source of energy supplied through the power lines 430 and 431. The control circuit for the electrically operated clamping control valve includes a manually operated switch 432 and a relay switch 433. With the manual operated switch in the open condition and a source of energy supplied to power lines 430 and 431 the circuit to one side of the clamping valve will be completed through the bar 434 which is spring-biased by a spring 435 into engagement with contacts 436 positioning the valve as shown at $d$. This will supply fluid through the conduit 339 connected to the lower inlets of the cylinders 330 thereby raising the upper clamping plate 320 to the position shown in FIG. 13. By closing the manually operated switch 432 the circuit is completed to the solenoid 437 of the relay switch 433. This will move the bar 434 against the bias of the spring 435 into engagement with contacts 438 completing the circuit to the opposite side of the clamping control valve and reversing the valve to provide fluid through conduit 338 to the upper inlets of the cylinders 330. The upper clamping plate 320 will therefore be forced to the lower position shown in FIG. 11.

The control circuit for the release control valve includes a relay switch 440 and a normally open microswitch 441. With a source of energy supplied through the power lines 430 and 431 the circuit will be completed to one side of the release control valve through the bar 442 which is biased into engagement with contacts 443 by means of a spring 444. The valve is therefore positioned as shown at $e$ supplying fluid through the conduit 405 to the lower surface of the piston 396 moving it to the upper position. Temporary depression of the microswitch 441 will complete the circuit to the solenoid 445 of relay switch 440, moving the bar 442 into engagement with contacts 446 to complete the circuit to the opposite side of the release control valve reversing its position and moving the piston 396 and rod 397 downwardly into engagement with the arm of the L-shaped member 390. Releasing the micro-switch 441 will de-energize the solenoid of the relay switch 440 reversing the flow of fluid to the upper inlet of the cylinder 395.

Figure 15:
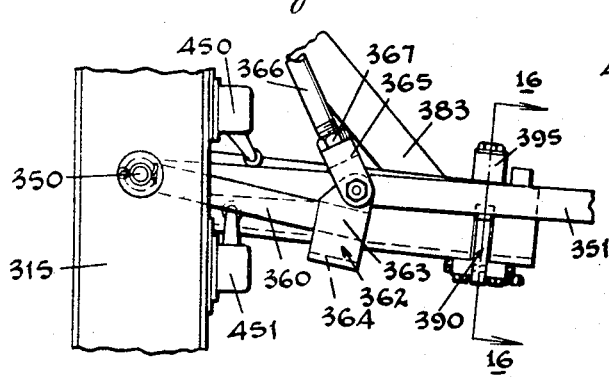
FIG. 15 is an enlarged fragmentary side elevation of the impact assembly of the modified form of the invention.
Figure 16:
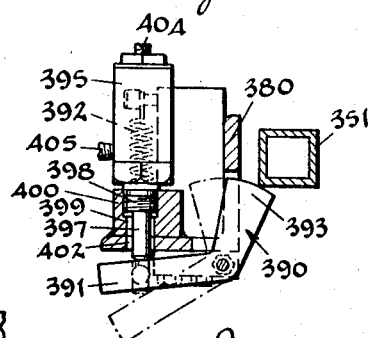
FIG. 16 is a transverse sectional view taken along lines 16—16 of FIG. 15.

The control circuit for the lifting control valve includes an upper limit switch 450, a lower limit switch 451 and two relay switches 452 and 453. The upper and lower limit switches are mounted on the channel 315 in the path of movement of the pivotally mounted beam 351 (FIG. 15). With a source of energy supplied to the power lines 430 and 431, the relay switches are de-energized with the bar 455 of relay switch 452, being spring-biased into engagement with contacts 456 by means of a spring 457, positioning the lifting control valve as shown at $f$, and bars 466 and 467 of relay switch 453 being forced out of engagement with their respective contacts by a spring 459.

Pivotal downward movement of the beam 351 will release the upper limit switch completing the circuit to contact 460 through wires 461 and 462. Continued downward movement of the beam 351 will engage the lower limit switch 451, completing the circuit to the solenoid 465 of relay switch 453. This will move the bars 466 and 467, into respective engagement with contacts 460 and 468 and contacts 469. The circuit will therefore be completed through the bar 467, and contacts 469 to the solenoid 470 of relay switch 452, which in turn will move the bar 455 into engagement with contacts 472 completing a circuit to the opposite side of the lifting valve 422 and reversing the position of the valve to provide fluid through conduit 373 to cylinder 369 which will raise the lifting member 362. The lower leg 364 of the lifting member 362 will engage the beam 351 raising it to the upper position.

The first pivotal movement of travel of the beam 351 will open the lower limit switch 451. However, both relay switches will remain energized through the holding circuit provided through wires 461 and 462 and the bar 466 engaging contacts 460 and 468. Continued movement of the beam 351 will move it past the L-shaped member allowing the arm 393 to engage the lower surface of the beam and at the same time engage the upper limit switch opening the circuit to the contact 460. This in turn will de-energize the solenoid 465 of the relay switch 453 allowing the action of the spring 459 to move the bars 446 and 467 out of engagement with their respective contacts. The bar 467 being moved out of engagement with the contacts 469 will de-energize the solenoid 470 of relay switch 452 thereby allowing the spring 457 to move the bar 455 into engagement with the upper contacts, reversing the position of the lifting control valve and providing fluid through the conduits 372 to the upper surface of the piston 368 which in turn will move the lifting member 362 to the lower position.

For the purpose of describing the operation of the testing device, it will be assumed that appropriate calculations have been made and the fluid pressure is set at the desired value to correspond to the desired amount of clamping action between the clamping plates 320 and 321. Also, the release mechanism including the release member has been located in the desired angular relation to the support member 302 to provide the desired impact force on the specimen. It will further be assumed that a source of energy has been supplied to the power lines 430 and 431 positioning the respective control valves and cylinders with their various pistons as shown in FIG. 17. This will have the upper clamping plate in the raised position, the lifting member in the lowered position and the L-shaped member 390 spring-biased into engagement with the lower surface of the beam 351.

A test specimen or sheet member 490 is positioned on the lower clamping plate with the openings in the specimen engaging the respective eyelets on the locator buttons. By manual operation of the switch 432 the relay switch 433 will be energized reversing the position of the clamping control valve 420 which in turn will move the upper clamping plate into engagement with the test specimen clamping it between the upper and lower clamping plates.

Temporary depression of the micro-switch 441 will energize the relay switch 440 which will reverse the position of the release control valve 421, moving the rod 397 into engagement with the arm 391 of the release member 390. This will move the arm 393 out of engagement with the lower surface of the beam 351 allowing the impact member to drop onto the test specimen. The pivotal movement of the beam 351 will release the upper limit switch allowing it to close and engage the lower limit switch which will energize the solenoid 465 of the relay switch 453. This in turn will energize the solenoid 470 of the relay switch 452 which will reverse the position of the lifting control valve 422. Fluid will therefore be supplied through the conduit 373 raising the lifting member 362 which in turn will raise the beam 351 with its associated parts.

Upon reaching the upper position, the beam 351 will move past the arm 393 allowing the spring 392 to force the arm into engagement with the lower surface of the beam while the upper surface will engage the upper limit switch which in turn will de-energize the relay switch 453. The relay switch 453 will de-energize the solenoid of the relay switch 452 allowing the spring 457 to move the bar 455 into engagement with the contacts 456 reversing the lifting control valve which will supply fluid through the conduits 372 and will lower the lifting member.

The lifting member 362 will now be in the lowered position and the beam 351 will be held in the raised position by the arm 393 of the L-shaped member being spring-biased into engagement with the lower surface thereof. The apparatus will therefore be in a position to repeat the impact on the test specimen.

Upon completion of the required number of impacts on a particular specimen, the manual switch will be opened which reverses the flow of the clamping control valve raising the upper clamping plate. The specimen may then be removed.

A further modified form of clamping means or unit is shown in FIGS. 18 through 21. This unit is particularly adapted for impact testing of specimens, such as side windows or sidelites of an automobile, which include compound curvatures with a plurality of mounting openings adjacent one edge thereof.

Although the specific clamping means is disclosed in combination with the impact device shown in the preferred embodiment, it is to be understood that the clamping means is readily adaptable for use with the impact device shown in FIGS. 11 to 17.

Figure 18:
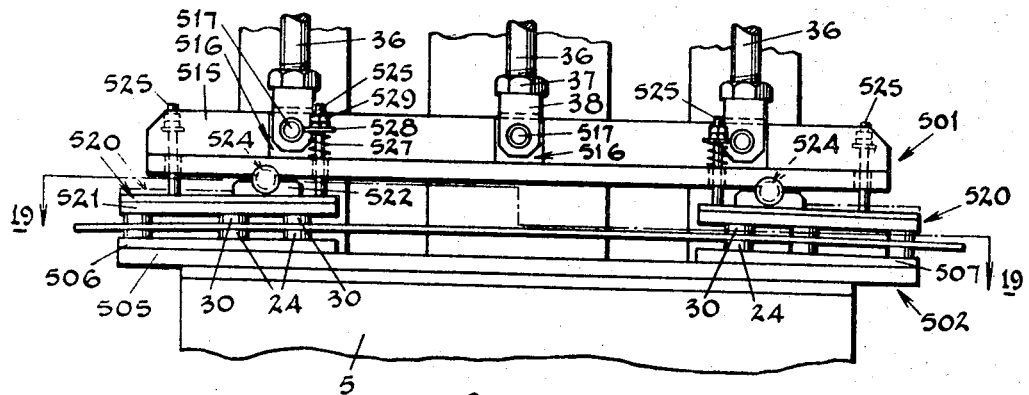
FIG. 18 is a fragmentary end view of a testing device including a further modified form of clamping assembly.
Figure 19:
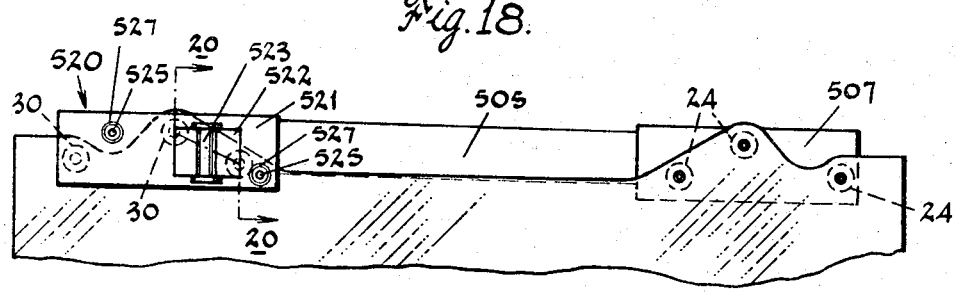
FIG. 19 is a longitudinal view taken along lines 19—19 of FIG. 18.

As shown in FIG. 18, the clamping means includes upper and lower clamping assemblies 501 and 502, respectively. The lower clamping assembly includes a bar 505 rigidly secured to the base 5 of the impact device shown in FIG. 1. Two plates 506 and 507 are mounted on the opposite ends of the bar with each of the plates having a generally curved upper surface. Each plate is provided with three spaced openings 508 therein which receive inserts 509 also having an opening 510 therein. The openings 510 are provided with spacer locator buttons 24, such as shown in FIG. 8.

The upper clamping assembly includes a T-shaped bar 515 being provided with three enlarged portions 516 spaced along the leg of the T-shaped bar. Each of the enlarged portions respectively receive the yokes 38 which are secured thereto by pins 517 extending through aligned openings. The bar is thereby capable of reciprocatory movement through the cylinders 34.

The upper clamping assembly includes two pivotally mounted clamping members 520. Since each of the members are identical in construction, only one will be described in detail.

The clamping member 520 includes a plate 521 having a block 522 extending from the upper surface thereof with a cylinder 523 fixed to the surface of the block. The cylinder is rotatably received in a semi-circular groove 524 provided in the bar 515 and retained therein by two rods 525 extending from diagonal corners of the upper surface of the plate 521. The rods extend through openings 526 in the T-shaped bar 515 and are provided with telescoping springs 527, one end of which engages the upper surface of the plate with the opposite end engaging washers 528 retained on the rods by means of adjustable lock nuts 529 received on threaded portions of the rods.

The plate 521 is further provided with three spaced openings 531 which are in alignment with the openings in the lower plate. Each of these openings is provided with an insert 532 having an opening 533 that receives mounting buttons, such as those disclosed at 30 in FIG. 8 of the preferred embodiment.

Figure 20:
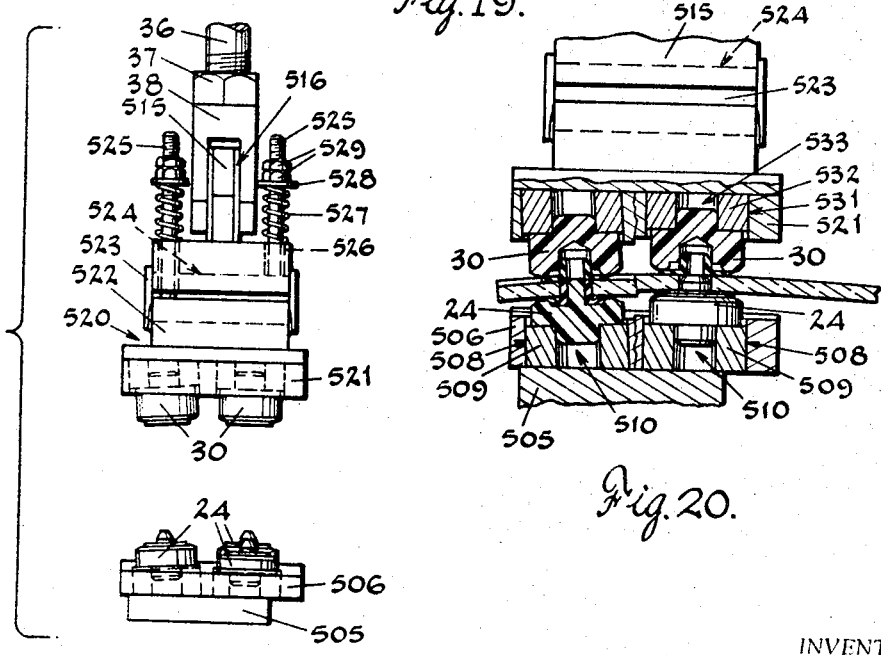
FIG. 20 is a transverse sectional view taken along lines 20—20 of FIG. 19.
Figure 21:
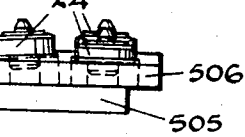
FIG. 21 is an end view of the modified form of clamping assembly in the open position.

The compound curvature of a sidelite disclosed herein dictates that the axis of the openings in the inserts 509 and 525 must be accurately located with respect to the mounting openings in the sidelite. One satisfactory manner of forming the inserts is to utilize a cerrobase material which is a relatively low melting point metal. Steel buttons are substituted for the resilient locator buttons 24 and 30 received in the mounting openings of the sidelite. The lite is then supported in any known manner and the plates 506, 507 or 521 positioned to receive a portion of the steel buttons therein. The cerrobase material is thereafter poured into the openings to surround the portion of the steel button therein. After the cerrobase material has cooled and hardened, the plate is removed from the lite having the steel buttons. This procedure will accurately locate the axis of the respective openings in the inserts with respect to the axis of the mounting openings in a sidelite having compound curves such as shown in FIG. 20.

The operation of the modified form of clamping means is readily understood with reference to FIG. 18. As noted above, the upper clamping assembly is mounted for vertical movement through the cylinders 34 and each of the clamping members 520 is capable of further movement about the axis formed by the cylinder 323. The tension of the respective springs 527 is originally adjusted by threading the lock nuts on the rods in such a manner that in the raised or opened position the clamping members assume a position such as shown by the broken lines in FIG. 18. Downward movement of the upper clamping assembly will have a first resilient locator button of the clamping plates 521 engage the upper surface of the glass. The plates will then rock or pivot about the cylinder 523 to allow the plates 521 to assume the full line position shown in FIG. 18. This arrangement will ensure that all the buttons will positively engage the glass surface and accurately duplicate the mounting of the sidelite in use.

As can be seen from the above description, the apparatus of the invention provides novel means for rapidly checking a specimen to determine its capability to withstand impact and vibratory forces. Furthermore, there is provided novel means of substantially reproducing the clamping and load conditions on the test specimen which will be encountered in actual mounting of the specimen in use.

Although the various specific clamping assemblies have been shown in combination with only one form of testing apparatus, it is readily apparent that the respective clamping assemblies are readily interchangeable. Also, it is within the spirit of the invention to provide any type of clamping assembly corresponding to a particular unit for the three specific assemblies disclosed.

It is to be understood that the forms of the invention herewith shown and described are to be taken as illustrative embodiments only of the same, and that various changes in the shape, size and arrangement of parts, as well as various procedural changes may be resorted to without departing from the spirit of the invention.

We claim:

1. Apparatus for impact testing glass sheets having holes drilled adjacent certain edges thereof, having in combination, a base, a first support mounted on said base, a lower clamping plate mounted on said base adjacent said first support, at least one fluid cylinder mounted on said support and spaced above said lower clamping plate, a piston slidably received in said cylinder, an upper clamping plate operatively connected to said piston, means for selectively supplying fluid to said cylinder to move said upper clamping plate toward said lower clamping plate thereby to grip said edges therebetween along a line extending through said holes thereby to cantilever support the sheet to be tested in a substantially horizontal plane, a second support mounted above said first support, an impact member including a sleeve and a weight mounted on the lowermost end of said sleeve, a guide assembly mounted on said second support and slidably receiving said sleeve to guide the movement of said impact member along a path intersecting said sheet at a predetermined point spaced outwardly of said clamping members, means mounted on said second support above said guide assembly retaining said impact member in a first position spaced a predetermined distance above said sheet, means selectively releasing said retaining means to allow said impact member to freefall into impact engagement with said predetermined point, a lifting member engageable with said impact member when the latter is in contact with the sheet, and an actuator responsive to the downward movement of said impact member to raise said lifting member and said impact member carried thereby upwardly and into engagement with said retaining means, said lifting member being moved out of engagement with said impact member in response to the upward movement of said member and as said member engages said retaining means.

2. Apparatus as defined in claim 1, wherein said second support is adjustably mounted on said first support, said weight is adjustably mounted laterally with respect to said sleeve and said retaining means is adjustably mounted on said second support to provide three-directional adjustment of said impact member with respect to said sheet to provide a varying impact load for sheets of varying size, shape and drilled hole layout.

3. Apparatus for impact testing glass sheets having holes drilled adjacent certain edges thereof having in combination, a base, first and second horizontally spaced supports upstanding from said base, a lower clamping plate mounted on said base adjacent said first support, a fluid cylinder mounted on said first support and spaced above said lower clamping plate, a piston slidably received in said cylinder, an upper clamping plate operatively connected to said piston, means for selectively supplying fluid to said cylinder thereby to move the upper clamping plate toward said lower clamping plate to grip said edges therebetween along a line extending through said holes thereby to cantilever support the sheet to be tested in a substantially horizontal plane, an impact member including an elongated arm having a weight fixed to one end thereof, said arm being pivotally mounted at its opposite end on said second support to swing through an arcuate path intersecting said sheet at a predetermined point spaced outwardly of said clamping members, means carried by said second support for retaining said impact member in a first position spaced a predetermined distance above said sheet, means selectively releasing the retaining means whereupon said impact member swings downwardly along said path into impact engagement with the sheet at said predetedmined point, a lifting member engageable with said impact member when the latter is in contact with said sheet, and actuator responsive to the downward movement of said impact member to raise said lifting member and said impact member carried thereby upwardly and into engagement with said retaining means, said lifting member being moved out of engagement with said impact member in response to the upward movement of said member and as said member engages said retaining means.

4. Apparatus as defined in claim 3, wherein said retaining means is adjustable to raise or lower said impact member with respect to said sheet to provide a varying impact load for sheets of varying size, shape and drilled hole layout.

References Cited

UNITED STATES PATENTS

| 1,901,460 | 3/1933 | Lewis | 73—12 |
| 2,052,357 | 8/1936 | Lukens | 73—12 |
| 2,377,536 | 6/1945 | Wisner | 73—12 |
| 2,500,933 | 3/1950 | Dailey | 269—26 |
| 2,579,503 | 12/1951 | Lubin et al. | 73—12 |
| 2,799,824 | 7/1957 | Heynick et al. | 73—12 |
| 2,890,766 | 6/1959 | Sargeant | 73—12 |

FOREIGN PATENTS 1,173,988  11/1958  France.

RICHARD C. QUEISSER, *Primary Examiner.*

JAMES J. GILL, *Examiner.*

J. H. WILLIAMSON, *Assistant Examiner.*